United States Patent
Turlapati

(10) Patent No.: US 9,649,574 B2
(45) Date of Patent: May 16, 2017

(54) FIELD REPLACEABLE MULTIFUNCTIONAL CARTRIDGE FOR WASTE CONVERSION INTO FUEL

(76) Inventor: Raghavendra Rao Turlapati, Mumbai (IN)

( * ) Notice: Subject to any disclaimer, the term of this patent is extended or adjusted under 35 U.S.C. 154(b) by 585 days.

(21) Appl. No.: 14/117,985

(22) PCT Filed: Feb. 29, 2012

(86) PCT No.: PCT/IN2012/000140
§ 371 (c)(1),
(2), (4) Date: Nov. 15, 2013

(87) PCT Pub. No.: WO2012/156984
PCT Pub. Date: Nov. 22, 2012

(65) Prior Publication Data
US 2014/0073825 A1   Mar. 13, 2014

(30) Foreign Application Priority Data
May 16, 2011   (IN) .......................... 1493/MUM/2011

(51) Int. Cl.
*B01D 3/00* (2006.01)
*B01D 53/00* (2006.01)
(Continued)

(52) U.S. Cl.
CPC ............. *B01D 3/009* (2013.01); *B01D 53/82* (2013.01); *B01D 53/88* (2013.01); *B01J 8/0453* (2013.01);
(Continued)

(58) Field of Classification Search
CPC .......... B01D 3/00; B01D 3/009; B01D 53/32; B01D 53/74; B01D 53/81; B01D 53/82;
(Continued)

(56) References Cited

U.S. PATENT DOCUMENTS 4,816,137 A * 3/1989 Swint .................... B01J 8/1809
208/153
5,730,947 A   3/1998 Chaussonnet
(Continued)

FOREIGN PATENT DOCUMENTS

WO   2009025003   2/2009

OTHER PUBLICATIONS

International Search Report for PCT/IN2012/00140 dated Oct. 1, 2012.

*Primary Examiner* — Natasha Young
(74) *Attorney, Agent, or Firm* — Kramer Amado P.C.

(57) ABSTRACT

Disclosed herein is a field replaceable multifunction cartridge for the conversion of composite high molecular weight hydrocarbon vapors, extracted from homogenous or heterogeneous, segregated or unsegregated, wet or dry, unclean miscellaneous multi-feed waste input, to produce low molecular weight fractions of industriously combustible fuel products through catalytic cracking. The multifunction cartridge system is constructed in a modular fashion is capable of performing the catalytic, cleaning and scrubbing functions through the temperature range ranging from ambient to 500° C., owing to the high mechanical strength, low coefficient of expansion, resistance to thermal fatigue etc.

12 Claims, 4 Drawing Sheets

(51) Int. Cl.
| | |
|---|---|
| B01D 53/34 | (2006.01) |
| B01D 53/74 | (2006.01) |
| B01D 53/81 | (2006.01) |
| B01D 53/82 | (2006.01) |
| B01D 53/88 | (2006.01) |
| B01J 8/00 | (2006.01) |
| B01J 8/02 | (2006.01) |
| B01J 8/04 | (2006.01) |
| B01J 19/00 | (2006.01) |
| B01J 19/24 | (2006.01) |
| B01J 20/00 | (2006.01) |
| B01J 35/00 | (2006.01) |
| B01J 35/02 | (2006.01) |
| B01J 20/02 | (2006.01) |
| B01J 20/04 | (2006.01) |
| B01J 20/10 | (2006.01) |
| B01J 20/12 | (2006.01) |
| B01J 20/20 | (2006.01) |
| B01J 20/28 | (2006.01) |
| C10G 1/00 | (2006.01) |
| C10G 1/10 | (2006.01) |
| C10K 1/02 | (2006.01) |
| C10K 1/34 | (2006.01) |
| C10K 3/02 | (2006.01) |
| B01J 20/06 | (2006.01) |

(52) U.S. Cl.
CPC ....... *B01J 20/0237* (2013.01); *B01J 20/0281* (2013.01); *B01J 20/046* (2013.01); *B01J 20/06* (2013.01); *B01J 20/10* (2013.01); *B01J 20/12* (2013.01); *B01J 20/20* (2013.01); *B01J 20/28052* (2013.01); *B01J 35/0013* (2013.01); *B01J 35/023* (2013.01); *C10G 1/002* (2013.01); *C10G 1/10* (2013.01); *C10K 1/024* (2013.01); *C10K 1/34* (2013.01); *C10K 3/023* (2013.01); *B01D 2251/304* (2013.01); *B01D 2251/404* (2013.01); *B01D 2251/602* (2013.01); *B01D 2251/608* (2013.01); *B01D 2253/102* (2013.01); *B01D 2253/106* (2013.01); *B01D 2253/1124* (2013.01); *B01D 2255/2092* (2013.01); *B01D 2255/20738* (2013.01); *B01D 2255/20761* (2013.01); *B01D 2256/24* (2013.01); *B01D 2257/20* (2013.01); *B01D 2257/30* (2013.01); *B01J 2208/00539* (2013.01); *B01J 2208/00884* (2013.01); *B01J 2208/025* (2013.01); *B01J 2208/026* (2013.01); *B01J 2219/0002* (2013.01); *B01J 2219/00038* (2013.01); *B01J 2220/62* (2013.01)

(58) Field of Classification Search
CPC B01D 53/88; B01D 2253/00; B01D 2253/10; B01D 2253/102; B01D 2253/106; B01D 53/34; B01D 53/00; C10G 1/00; C10G 1/002; B01J 8/0002; B01J 8/04; B01J 8/0446–8/0453; B01J 19/00; B01J 19/24; B01J 20/00; B01J 20/02; B01J 20/0203; B01J 20/0233; B01J 20/0237; B01J 20/0274; B01J 20/0281; B01J 20/04; B01J 20/046; B01J 20/10; B01J 20/12; B01J 20/20; B01J 20/28; B01J 20/28002; B01J 20/28052; B01J 35/00; B01J 35/0013; B01J 35/02; B01J 35/023; B01J 2208/000008; B01J 2208/00539; B01J 2208/00743; B01J 2208/00884; B01J 2208/02; B01J 2208/023–2208/026; B01J 2219/00; B01J 2219/00002; B01J 2219/00018; B01J 2219/0002; B01J 2219/00027; B01J 2219/00038; B01J 2220/50; B01J 2220/62; B01J 8/00; B01J 8/02

See application file for complete search history.

(56) References Cited

U.S. PATENT DOCUMENTS

2007/0179326 A1  8/2007  Baker
2009/0064578 A1  3/2009  Theegala et al.

* cited by examiner

FIELD REPLACEABLE MULTIFUNCTIONAL CARTRIDGE FOR WASTE CONVERSION INTO FUEL

CROSS-REFERENCE TO RELATED APPLICATIONS

The present application is a U.S. national phase entry of International Patent Application No. PCT/IN2012/000140, now WO 2012/156984, filed on Feb. 29, 2012, which claims foreign priority on Indian Patent Application No. IN 1493/MUM2011 filed on May 16, 2011, and incorporated by reference herein in its entirety.

FIELD OF INVENTION

The present invention relates to conversion of synthetic polymers, Rubber, organic wastes, municipal solid sewage wastes (MSW) and biomass feed to combustible fuel products. More specifically, the invention relates to a field replaceable multifunctional cartridge for the conversion of composite high molecular weight hydrocarbon vapours, extracted from homogenous or heterogeneous, segregated or comingled, moist and unclean miscellaneous multi-feed waste input, to produce low molecular weight fractions of industriously combustible fuel products through catalytic cracking.

BACKGROUND OF INVENTION

Waste management still remains a challenge to the urban, semi-urban, rural, developed, developing and under-developed communities and civilizations and lack of necessary knowledge and resources is further hampering intentions and initiative for the same. Ozone depletion, exponentially rising values of per capita carbon foot-prints, greenhouse emissions and global warming are subjects of discussion, debates and negotiations globally, compelling researchers to seek short term as well as long term solutions for reversing the negative trends. As a result, an immense amount of research is being poured into achieving ways and means for waste management while utilizing humongous amounts of wastes generated as sources for generating forms of renewable energy.

Various methods of waste management such as land filling, plasma arc waste disposal, gasification, trans-esterification, incineration, bio-drying, mechanical heating, pulverising and thereafter pelletizing, combustion of dry waste material, fermentation into bio-gas making, etc. have been researched upon and are now being looked into for development of resources for sustainable and renewable sources of energy. Most of these processes involve extraction of hydrocarbons using any suitable process and their subsequent cracking. Processes for different types of cracking of hydrocarbons are known such as thermal cracking, pyrolytic cracking, etc. and are employed with or without use of catalysts. The cracking processes using catalysts may employ homogenous or heterogeneous, fixed-bed or fluid-bed catalysts.

Conventionally, some processes utilise catalysts by mixing them intrinsically with reactants. Such a step does not guarantee a uniform contact between the catalyst and reactants; as a result, the catalytic conversion/reaction is rendered inefficient and incomplete generating waxy and inconsistent products. When catalysts are mixed along with the feed material at fixed weight proportions, the volatile gases generated often lead to catastrophic explosions. Further, the end products like the liquid fuels, the non-condensable gases in such processes end up laced with the catalyst residues which contaminate the quality of the yield. The discharges from the process also contain the residual catalyst material, which makes the discharges an environmental hazard. Such discharges are inappropriate and unfit to be land-filled or disposed off in any other manner.

External catalysts may be used, but they have a limited tolerance for moisture in the reactants and/or vapour feed, being catalysed. The catalysts get eroded or contaminated over a short period of time while being utilised in the process. The time and effort required to replace the catalysts add substantially to the operational down time and subsequently, operational costs of the plant. Conventional catalysts used in multitude of processes lead to various effluents in each of the varied processes. Besides, the vapours and reformed gases from the catalytic convertors often require secondary processing to remove particulate matter using hydro cyclones from gases and filters to clean liquid fuels. This adds to increased capital and operational costs, larger equipment foot print and frequent maintenance. The presence of pollutants in the gases, require an additional step of scrubbing. Scrubbers which conventionally use liquid phase scrubbing agents, lead to increased capital costs, operational costs besides adding to the disposal problems with scrubbing fluids.

WO 2005/087897 describes a process and plant for thermo catalytic conversion of waste materials into reusable fuels and a fuel produced by the said process. The application proposes use of a conventional catalytic reactor tower that uses high surface area metal plates arranged in a torturous path as catalysts. The said arrangement thus becomes bulky and inconvenient for serviceability and maintenance and requires a halt in the working of the plant in order to carry out the servicing and maintenance. The functioning of the said tower is dependent upon maintaining its temperature to 220° C. thus adding to the additional steps and operational parameters required in the process. Besides, the non-condensable gases and the liquid fuels require additional filtration and scrubbing steps which add to additional equipment, increased capital cost and many more equipment requiring maintenance in the operation of the plants.

Thus, there is need in the present state of the art for a stable catalytic conversion system that is hassle free, convenient, durable, and recyclable and incurs least maintenance and operation costs.

SUMMARY OF INVENTION

A field replaceable, recyclable Multifunctional Cartridge system for waste conversion into industriously combustible fuels is disclosed herein. The multifunctional cartridge system is constructed such that it is modular in its embodiment and does not halt the working of process, should there be an instance where the cartridge has to be changed due to contamination or due to any snag in any of its cartridges. The multifunctional cartridge system is capable of performing the catalytic cracking, cleaning and scrubbing functions through the temperature range ranging from ambient to 500° C., owing to the high mechanical strength, low coefficient of expansion, resistance to thermal fatigue etc.

The said field replaceable multifunctional cartridge system comprises of rows consisting of multiple arrays of tubes containing the multifunctional cartridges. The field replaceable multifunctional cartridge system for waste conversion into fuel comprises of a plurality of said cartridges composed of agglomerated nano-particles arranged in layered column/beds.

The current invention further discloses a method for the conversion of high molecular weight processed homogeneous and heterogeneous, segregated or unsegregated, wet or dry carbonaceous feedstock vapours into hydrocarbon fuels and carbon using said field replaceable multifunctional cartridge system.

The current invention further discloses use of the field replaceable multifunctional cartridge system for the conversion of high molecular weight processed homogeneous and heterogeneous segregated or unsegregated, wet or dry carbonaceous feedstock vapours into hydrocarbon fuels and carbon.

DETAILED DESCRIPTION OF INVENTION

The invention will now be described in detail in connection with certain preferred and optional embodiments, so that various aspects thereof may be more fully understood and appreciated.

The present invention, in accordance with the objectives, relates to a field replaceable multifunctional cartridge for conversion of high molecular weight processed homogeneous and heterogeneous carbonaceous feedstock vapours into hydrocarbon fuels and carbon.

Vapours from pre-processed feed stock of a pyro-catalytic reaction are drawn into the system of multifunctional cartridges. The multifunctional cartridge breaks the high molecular weight gases and vapours into hydrogen, methane and low molecular weight hydrocarbon molecules, and reforms these molecules into molecular chains which are very similar to the standard hydrocarbon products such as gasoline, kerosene, diesel etc.

The multifunctional cartridge system is constructed in a modular fashion is capable of performing the catalytic, cleaning and scrubbing functions through the temperature range ranging from ambient to 500° C., owing to the high mechanical strength, low coefficient of expansion, resistance to thermal fatigue etc.

Figure 1:
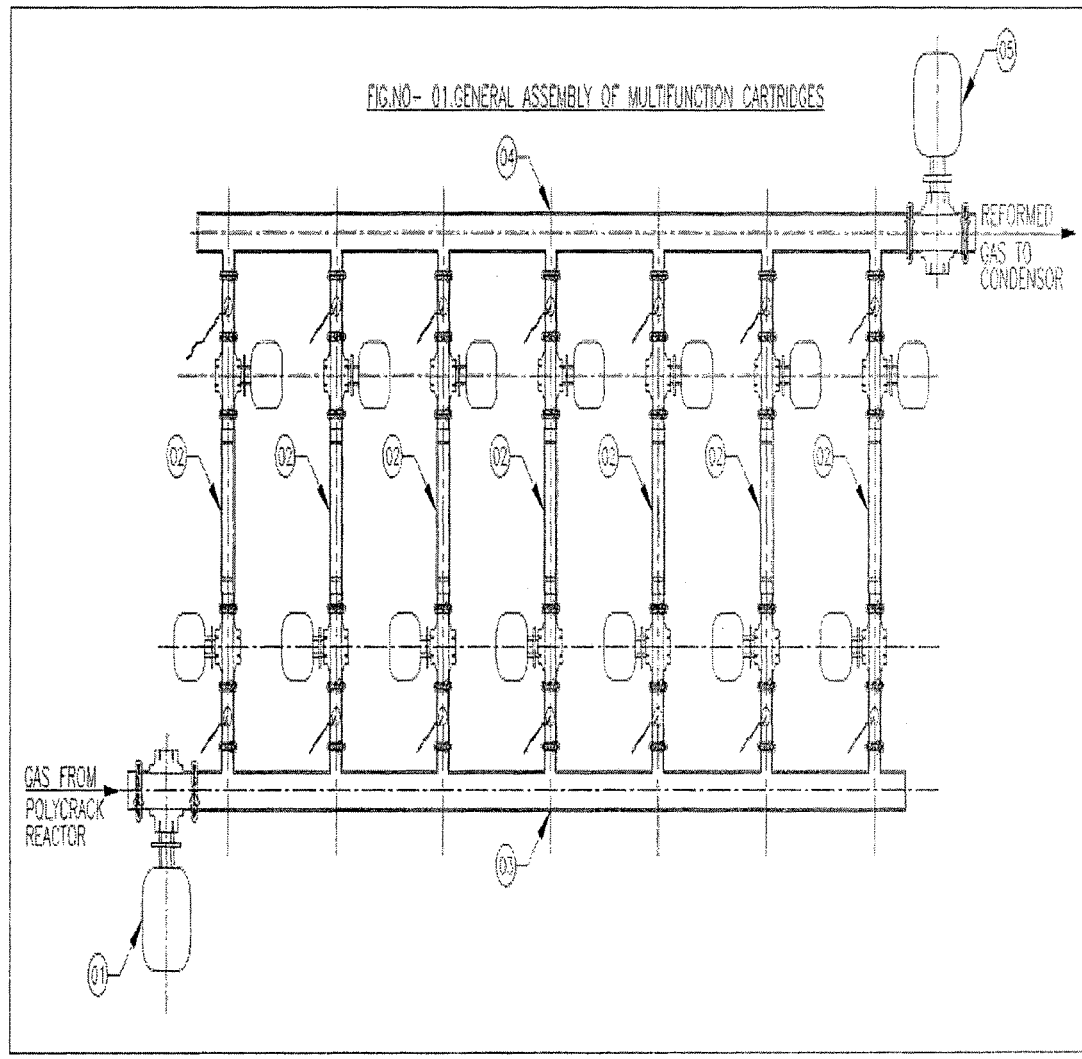
FIG. 1 illustrates the arrangement of multifunctional cartridge arranged in a system of the present invention.
Figure 2:
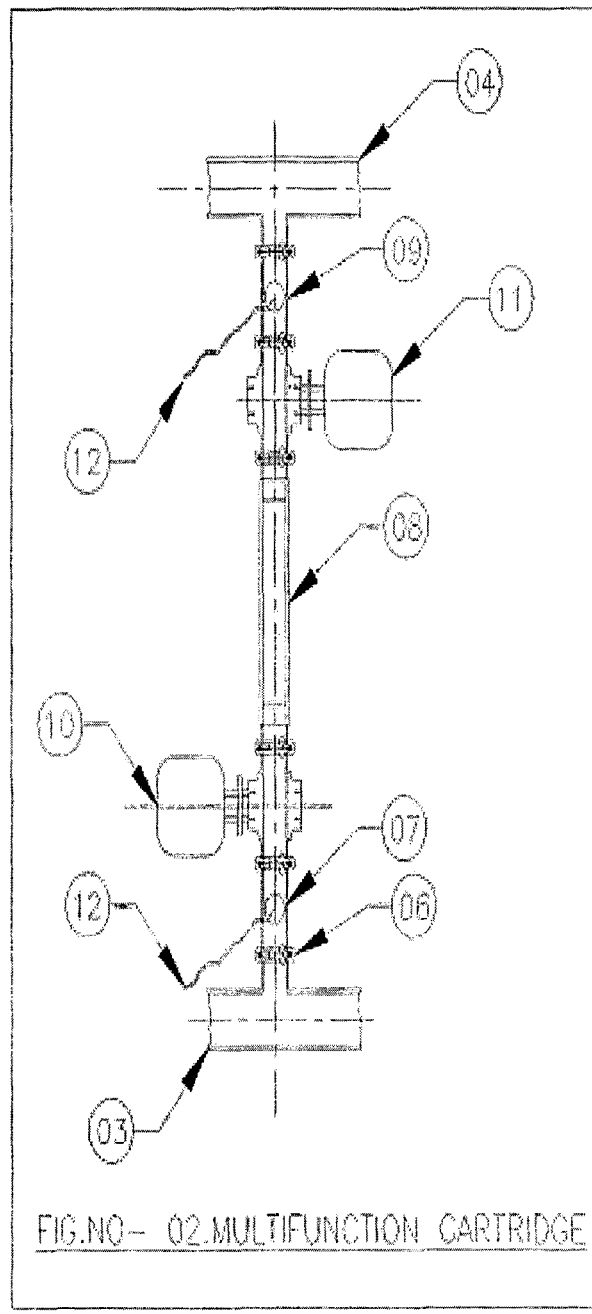
FIG. 2 illustrates various components of the multifunctional cartridge.

Accordingly, as illustrated in FIG. 1, the field replaceable multifunctional cartridges (02) are arranged in a row, the row consisting of a series of tubes connected in parallel in a single row enclosed between common inlet valve (01) and common outlet valve (05). The cartridges (2) are connected between a common inlet manifold (3) and a common outlet manifold (4). As illustrated in FIG. 2, each multifunctional cartridge (02) is held in the tubes having common inlet manifold (03) and common outlet manifold (04). The arrangement is provided with quick release couplings (06) for easy removal or dismantling of the multifunctional cartridge even while the conversion is in progress. Each individual multifunctional cartridge has a motorised inlet valve (10) and a motorised outlet valve (11). The valves are controlled using micro-processors. The opening and closing of individual inlet and outlet valves is controlled by inlet pressure sensor (07) and the outlet pressure sensor (09) at the inlet and outlet valve respectively. The sensors monitor pressure and abnormal change in the pressure due to catalyst contamination or choking due to waxes etc. As a result, the valves are enabled to automatically shut off in case of any malfunctioning in the multifunctional cartridges while the flow of input vapours is diverted to another tube which functions in a similar way.

The multifunctional cartridges are loaded with pre-designated catalyst such as an agglomerated single or multi layered nano-catalyst. The thickness of the catalyst column in the multifunctional cartridges controls the output product composition. The thicker the column, the lighter fractions or combustible gases in the output and the thinner the column width, the higher viscosity fuels are generated. Thus, the catalyst column thickness is a critical function of the process. The said pre-designated catalyst may be a nano structure catalyst having a blend of nano-particles of the metal, metal oxide, metal hydroxides of the group 4 metals from period 4 and Block D of the Periodic table either alone or combination thereof. The particle size of the nano catalyst is in the range of 20 to 100 nano-meters which are agglomerated to nanocatalyst having the particle size in the range of 100-500 microns. The agglomerated nano-catalyst having a specific gravity of 4.0 to 5.0 is placed inside the catalytic convertor tubes having a column thickness in the range of 1 cm to 100 cms and beyond.

Figure 4:
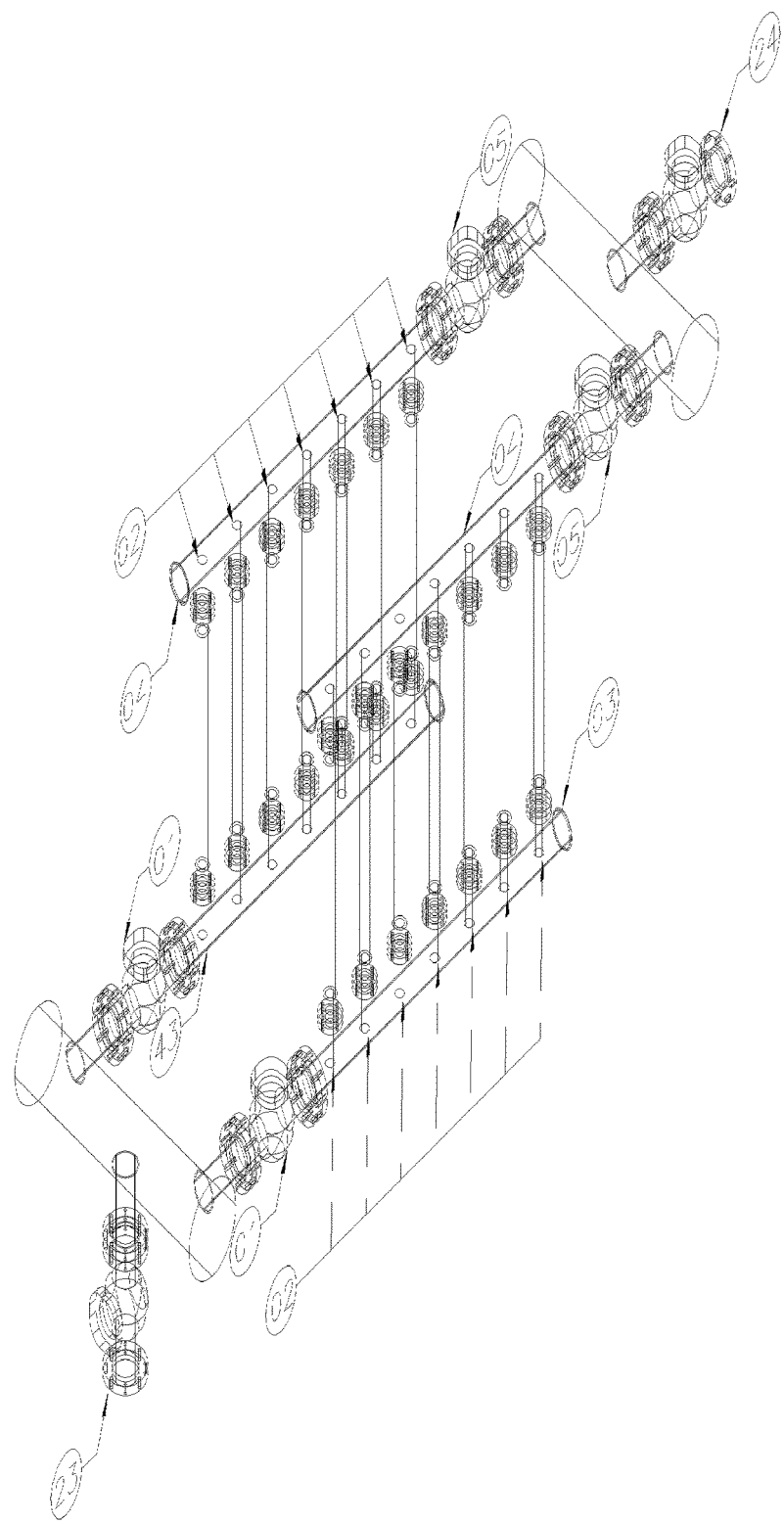
FIG. 4 illustrates the Rows of multifunctional cartridge arranged in a system of the present invention

Any choking of the catalyst will increase the pressure inside the multifunctional cartridge which is sensed by the sensors. The sensors then send a signal to the microprocessor which immediately redirects the flow of the processed input vapours to an idle multifunctional cartridge by opening the valves of that multifunctional cartridge while shutting off the valves at the choked multifunctional cartridge. This operation is carried out automatically and the microprocessor indication of a choked multifunctional cartridge then leads to the replacement of the said choked multifunctional cartridge by an operator. The multifunctional cartridges may be constructed from Stainless Steel, Carbon Steel, Aluminium and other metals, Reinforced Fibre glass, Polymer based materials and any other material that can withstand a temperature of up to 500° C. The multifunctional cartridges are connected to common inlet manifold (03) from one side and a common outlet manifold (04) from the other sides. Both the inlet and outlet sides are equipped with flow control valves, (10) and (11) respectively, which are hydraulically or pneumatically controlled through a microprocessor control. A row normally consists of 7 multifunctional cartridges, each for a day. There are two rows connected in parallel thus making 14 multifunctional cartridges as shown in FIG. 4. A common discharge valve (23) connected to the outlet of the Reactor vessels, allows the passage of vapours into the common inlet manifolds of each row. The common discharge valve (24) releases the reformed gases into the inlet of the condenser. The multifunctional cartridges are individually connected to the manifold through quick release couplings (06). The couplings can be detached quickly for the change of the tubes while the process is being carried out. This change is accomplished by the closing of valves connecting the inlet and outlet manifolds with the multifunctional cartridges. The two rows of multifunctional cartridges make one module. Several modules may be attached to each other in series through the end connectors provided on the manifolds. This increases the capacity of the multifunctional cartridges to handle larger volume of gases when large volume of in-feed material has to be handled. The catalyst modules can be added or removed at will, based on the site requirement.

The dimensions of the multifunctional cartridges are flexible and the diameter of the multifunctional cartridges can vary from 0.5 inches to 3 inches depending upon the volume of the gas expected to be handled. Diameter greater than 3 inches may also be accommodated for handling large volume flow of vapours and gases.

Figure 3:
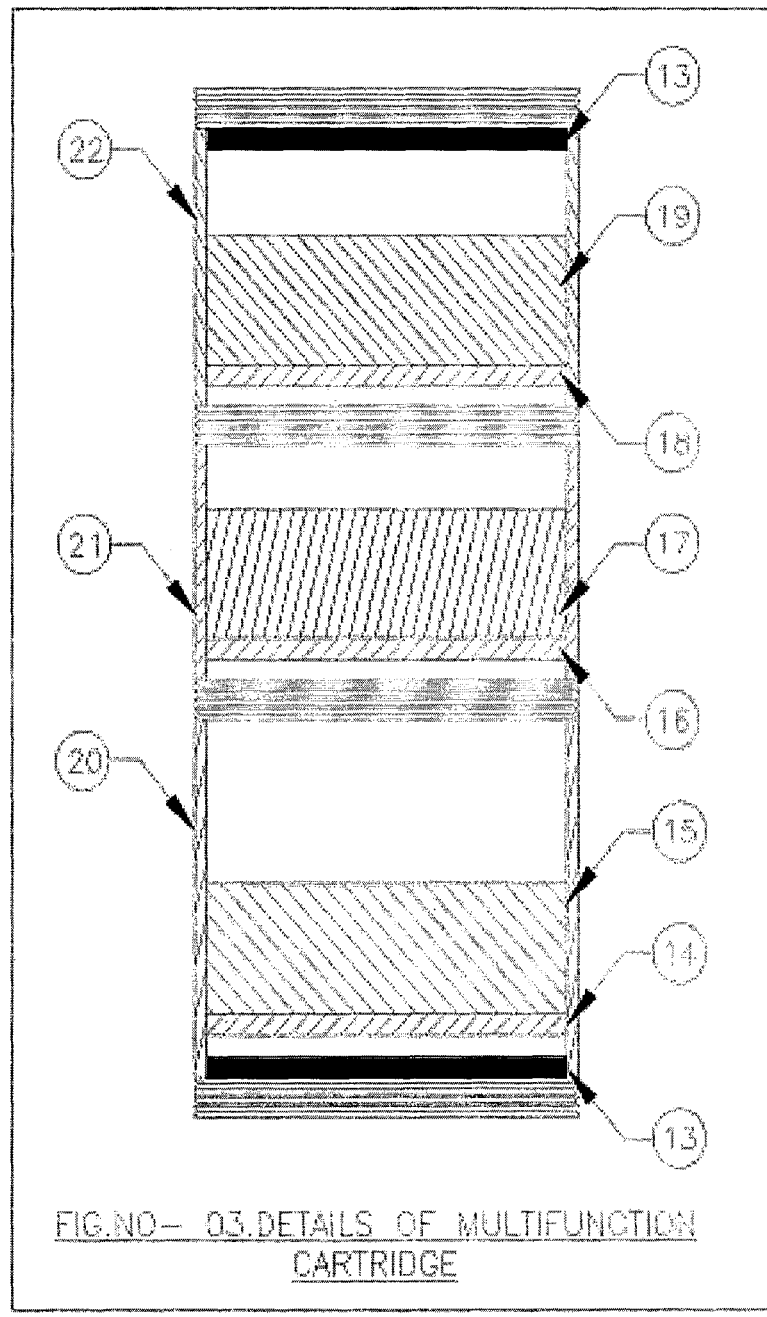
FIG. 3 illustrates the layered composition of the multifunctional cartridge.

The layered structure of the catalyst composition in the multifunctional cartridge is illustrated in FIG. 3. A tube, made of Stainless Steel or any temperature resistance material, called a holder tube holds the catalyst composition. The tube is equipped with seals at both ends, by inlet pressure-tight seal (13) and outlet pressure-tight seal (13). Perforated media support (14 and 16) hold the lower segment (20) of the multifunctional cartridge wherein the multifunction catalyst bed (15) facilitates conversion of the vaporised input feed stock to combustible hydrocarbon fuels. Perforated media support (16 and 18) hold the middle segment (21) of the multifunctional cartridge wherein gas cleaner particulate media (17) helps cleaning of the vaporised gas. Perforated media support (18) and outlet pressure-tight seal (13) hold the upper segment (22) of the multifunctional cartridge wherein gas scrubbing media (19) facilitates scrubbing of the output gas. Thus, no further post-processing of the output is required. The sequence of the catalyst media, filtration media and the scrubbing media can be interchanged as required to facilitate different process functions. A particular media can be replaced with a different functional media. For example, filtration media can be replaced with another catalyst or scrubbing media to vary the functionality of the Multifunctional tube to facilitate changes in process depending upon the type of feed stock being processed. Perforated media support (14) is a metal plate with perforations, which is covered with a fine metal mesh, to support the catalyst media (15) and allow the passage of vaporised feed stock, to pass through the catalyst without obstruction. The perforations in the media support ensure equal distribution of the vapours through the catalyst bed (15), thus enabling 100% contact of the vapours with the catalyst. This ensures complete conversion of the vaporised feed stocks into hydrocarbons and the consistency of the product is always maintained. The Perforated media support (16) is a metal plate with perforations, covered with a fine metal mesh, which supports the vapour filter (17) typically comprising granulated or coarse particles of crushed glass, sand, silica, granulated carbon as individual layers or layers of more than one material from glass, sand, silica, carbon layered on top of each other. The vapour filter (17) materials filter out the carbon particles and other particulate matter from the vapours. Thus the vapours when condensed into liquids are free from carbon and particulate matter eliminating the need for subsequent filtration media like hydro cyclones for gases and other filtration devices for the liquid hydrocarbons obtained from the process. Perforated media support (18) is a metal plate with perforations, covered with a fine metal mesh, to support solid scrubbing media (19). The gases when passed through the scrubbing media (19) adsorb the contaminants from the gases such as sulphurous products, halogen products, and acidic vapours. The scrubbing media is a mixture of different scrubbing agents consisting of individual or blended or layered compositions consisting of Iron Oxide >30% and <50%, Oxides of Aluminium 5-10%, Calcium Oxide 1-5%, Copper sulphate 10%-20%, Sodium Chloride <15%, Montmorillinate clay <15%.

The multifunctional cartridge can be immersed in a cooling medium like water in order to stabilize the temperatures if required. Most generally, air cooling is sufficient to keep the catalyst tubes within the temperature limits for easy removal of the tubes without scalding the operators.

Thus, in a most preferred embodiment, the present invention relates to a field replaceable multifunctional cartridge, as in FIG. 2, for conversion of high molecular weight, processed raw input feedstock vapors into hydrocarbon fuels and carbon comprising:

an upper gas scrubbing portion (22)/chamber having gas scrubbing media to facilitate scrubbing of output gases, a Middle cleaning portion (21)/chamber having gas cleaning media to facilitate cleaning/purification of intermediate vaporized output/gases, and a lower catalytic portion (20)/chamber having single or multilayered catalyst bed to facilitate conversion of vaporized input feedstock to various hydrocarbon multifractions;

wherein, the said chambers are interchangeable for functional flexibility and wherein, the said chambers are bound/held between motorized inlet valve (10) and motorized outlet valve (11), separated by perforated media (14,16,18).

As described in the most preferred embodiment, the said field replaceable multifunctional cartridge cartridge (02) is arranged in a plurality of rows (FIG. 4). Each of the said rows consist of a plurality of cartridges (FIG. 4) enclosed in tubes (03 and 04) connected in parallel between a common inlet valve (01) and an common outlet valve (05).

Further, each of said tubes (08) in field replaceable multifunctional cartridge contain the field replaceable multifunctional cartridge (08) between motorized inlet valve (10) and motorized outlet valve (11), monitored by inlet pressure sensor (07) and outlet pressure sensor (09). The said valves are hydraulically or pneumatically or electrically controlled by microprocessors.

In the field replaceable multifunctional cartridge of the instant invention the inlet pressure sensor (07) and outlet pressure sensor (09) monitor change in pressure at said motorized inlet valve (10) and motorized outlet valve (11) caused by contamination of said catalyst bed. The motorized inlet valve (10) and motorized outlet valve (11) are enabled to shut down in case of any malfunctioning due to pressure fluctuations.

In the invention, the flow of preprocessed input feedstock vapours is diverted to subsequent functional tube (08) for maintaining a continuous catalytic process. The perforated media support (14) is a metal plate having perforations, covered with fine metal mesh, to ensure equal and uniform distribution of input vapours through catalyst bed without obstruction.

The cleaning media comprises granulated or coarse particles of crushed glass, sand, silica, granulated carbon as individual layers or layers of more than one material from glass, sand, carbon layered on top of each other to filter out particulate matter from the intermediate products/gases.

In another embodiment, the hydrocarbon product composition varies with the thickness of the catalyst bed. The diameter of said field replaceable multifunctional cartridges (08) vary from 12 mm to 77 mm.

In yet another embodiment, the multifunctional cartridges (08) are loaded with fixed-bed nano-agglomerated single or multilayered catalyst either alone or combination thereof with the particle size of the nano-catalyst is between 20-100 nanometers and the agglomerated granular size is between 100 to 500 microns.

The current invention further discloses a method for the pyro-catalytic conversion of high molecular weight processed homogeneous and heterogeneous, segregated or unsegregated, wet or dry carbonaceous feedstock vapours into hydrocarbon fuels and carbon using field replaceable multifunctional cartridge system. Accordingly, the vapors from pre-processed feed stock are drawn into the system of multifunctional cartridges where the high molecular weight gases and vapors are broken down to hydrogen, methane and low molecular weight hydrocarbon molecules, and reformed these molecules into molecular chains which are very similar to the standard hydrocarbon products such as gasoline, kerosene, diesel etc.

In another aspect, the present invention discloses the use of field replaceable multifunctional cartridge system for the conversion of high molecular weight processed homogeneous and heterogeneous, segregated or unsegregated, wet or dry carbonaceous feedstock vapours into hydrocarbon fuels and carbon.

As seen in the embodiment herein above, the present invention is modular in construction, hassle free in maintenance and very efficient in productivity. It takes vapour input and provides a efficiently monitored and controlled output. The multifunctional cartridges are thus useable variedly in purification plants of similar construct.

I claim:

1. A field replaceable multifunctional cartridge for conversion of high molecular weight processed raw input carbonaceous feedstock vapors into hydrocarbon fuels and carbon comprises;
    an upper gas scrubbing portion/chamber having gas scrubbing media to facilitate scrubbing of output gases,
    a middle cleaning portion/chamber having gas cleaning media to facilitate cleaning/purification of intermediate vaporized output/gases, and
    a lower catalytic portion/chamber having single or multilayered catalyst bed to facilitate conversion of vaporized input feedstock to various hydrocarbon multifractions;
wherein, the said chambers are interchangeable for functional flexibility, and wherein, the said portions/chambers are bound/held between motorized inlet valve and motorized outlet valve, separated by perforated media support.

2. A field replaceable multifunctional cartridge as claimed in claim 1, wherein, said perforated media support is a metal plate having perforations, covered with fine metal mesh, to ensure equal and uniform distribution of input vapours though catalyst bed without obstruction.

3. A field replaceable multifunctional cartridge as claimed in claim 1, wherein, said cleaning media comprises granulated or coarse particles of crushed glass, sand, silica, granulated carbon as individual layers or layers of more than one material from glass, sand, carbon layered on top of each other to filter out particulate matter from the intermediate products/gases.

4. A field replaceable multifunctional cartridge as claimed in claim 1, wherein, the hydrocarbon product composition varies with the thickness of the catalyst bed.

5. A field replaceable multifunctional cartridge as claimed in claim 1, wherein, diameter of said field replaceable multifunctional cartridges vary from 12 mm to 77 mm.

6. A field replaceable multifunctional cartridge as claimed in claim 1, wherein, said multifunctional cartridges are loaded with any fixed-bed nano-agglomerated single or multilayered catalyst either alone or combination thereof, wherein the particle size of the nano-catalyst is between 20-100 nanometers and the agglomerated granular size is between 100 to 500 microns.

7. A method of pyro-catalytic conversion of high molecular weight processed homogeneous and heterogeneous, segregated or unsegregated, wet or dry carbonaceous feedstock vapors into hydrocarbon fuels and carbon, comprising passing the preprocessed vapors of feedstock through the field replaceable multifunctional cartridge of claim 1.

8. A system for conversion of high molecular weight processed raw input carbonaceous feedstock vapors into hydrocarbon fuels and carbon, said system comprising a plurality of field replaceable multifunctional cartridges, each field replaceable multifunctional cartridge comprising:
    an upper gas scrubbing portion/chamber having gas scrubbing media to facilitate scrubbing of output gases,
    a middle cleaning portion/chamber having gas cleaning media to facilitate cleaning/purification of intermediate vaporized output/gases, and
    a lower catalytic portion/chamber having single or multilayered catalyst bed to facilitate conversion of vaporized input feedstock to various hydrocarbon multifractions;
wherein said plurality of field replaceable multifunctional cartridges is connected in parallel between a common inlet manifold and a common outlet manifold.

9. The system as claimed in claim 8, wherein:
each of said field replaceable multifunctional cartridges has a motorized inlet valve and a motorized outlet valve;
said motorized inlet valve and said motorized outlet valve being monitored by an inlet pressure sensor and an outlet pressure sensor,
wherein said motorized inlet valve and said motorized outlet valve are hydraulically, pneumatically, or electrically controlled by microprocessors.

10. The system as claimed in claim 9, wherein said inlet pressure sensor and said outlet pressure sensor monitor change in pressure at said motorized inlet valve and said motorized outlet valve.

11. The system as claimed in claim 10, wherein said motorized inlet valve and said motorized outlet valve are adapted to shut down in case of any malfunctioning due to pressure fluctuations.

12. A method of pyro-catalytic conversion of high molecular weight processed homogeneous and heterogeneous, segregated or unsegregated, wet or dry carbonaceous feedstock vapors into hydrocarbon fuels and carbon, comprising passing the preprocessed vapors of feedstock through the field replaceable multifunctional cartridge system of claim 8.

* * * * *